(12) United States Patent
Chen et al.

(10) Patent No.: US 9,703,151 B2
(45) Date of Patent: Jul. 11, 2017

(54) LIQUID CRYSTAL DISPLAY WITH COLOR MOTION BLUR COMPENSATION STRUCTURES

(71) Applicant: Apple Inc., Cupertino, CA (US)

(72) Inventors: Yuan Chen, Santa Clara, CA (US); Zhibing Ge, Sunnyvale, CA (US); Adria Fores Herranz, San Jose, CA (US); Chia Hsuan Tai, Sunnyvale, CA (US); Hossein Nemati, Santa Clara, CA (US); Jun Jiang, Campbell, CA (US); Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/947,356

(22) Filed: Nov. 20, 2015

(65) Prior Publication Data

US 2016/0259218 A1 Sep. 8, 2016

Related U.S. Application Data

(63) Continuation of application No. 14/850,015, filed on Sep. 10, 2015.

(Continued)

(51) Int. Cl.
| | |
|---|---|
| *G02F 1/1343* | (2006.01) |
| *G02F 1/1335* | (2006.01) |
| *G02F 1/1368* | (2006.01) |
| *G02F 1/1337* | (2006.01) |

(52) U.S. Cl.
CPC ...... *G02F 1/134336* (2013.01); *G02F 1/1368* (2013.01); *G02F 1/133514* (2013.01);
(Continued)

(58) Field of Classification Search
CPC .......... G02F 1/134309; G02F 2201/52; G02F 1/133514; G02F 1/134363; G02F 2001/134372; G02F 2001/134381
See application file for complete search history.

(56) References Cited

U.S. PATENT DOCUMENTS

| | | | |
|---|---|---|---|
| 6,525,798 B1 * | 2/2003 | Yamakita | .......... G02F 1/134363 349/106 |
| 6,577,289 B1 | 6/2003 | Asao et al. | |

(Continued)

FOREIGN PATENT DOCUMENTS

| | | |
|---|---|---|
| CN | 1908786 A | 2/2007 |
| CN | 1987625 A | 6/2007 |

(Continued)

*Primary Examiner* — Paisley L Arendt
(74) *Attorney, Agent, or Firm* — Treyz Law Group, P.C.; G. Victor Treyz; Kendall W. Abbasi

(57) ABSTRACT

A layer of liquid crystal material may be interposed between display layers. The display layers may include thin-film transistor circuitry having subpixel electrodes for applying electric fields to subpixel portions of the layer of liquid crystal material. Subpixels of different colors may have different shapes and may have different liquid crystal layer thicknesses. These subpixel differences may be configured to slow the switching speed of subpixels of a certain color relative to other subpixels to reduce color motion blur when an object is moved across a black or colored background. The subpixels may have chevron shapes. Subpixels of a first color may have chevron shapes that are less bent than subpixels of second and third colors. In configurations with varying liquid crystal layer thicknesses, the subpixels of the first color may have thicker liquid crystal layers than the subpixels of the second and third colors.

7 Claims, 13 Drawing Sheets

Related U.S. Application Data

(60) Provisional application No. 62/128,453, filed on Mar. 4, 2015.

(52) U.S. Cl.
CPC .. G02F 1/133707 (2013.01); G02F 1/133753 (2013.01); G02F 1/134309 (2013.01); *G02F 1/133512* (2013.01); *G02F 2001/133757* (2013.01); *G02F 2001/134345* (2013.01)

(56) References Cited

U.S. PATENT DOCUMENTS

| | | |
|---|---|---|
| 6,759,172 B2 | 7/2004 | Huh et al. |
| 7,297,377 B2 | 11/2007 | Kagawa et al. |
| 7,499,115 B2 | 3/2009 | Kumagawa et al. |
| 8,411,232 B2 | 4/2013 | Tsuruma et al. |
| 8,432,522 B2 * | 4/2013 | Mori ................ G02F 1/134309 349/106 |
| 2007/0195231 A1 | 8/2007 | Kuribayashi et al. |
| 2009/0322702 A1 | 12/2009 | Chien et al. |
| 2010/0079712 A1 | 4/2010 | Tanaka et al. |
| 2010/0141874 A1 | 6/2010 | Morita |
| 2013/0135339 A1 | 5/2013 | Saini et al. |
| 2015/0198855 A1 | 7/2015 | Kim et al. |

FOREIGN PATENT DOCUMENTS

| | | |
|---|---|---|
| CN | 101320184 A | 12/2008 |
| CN | 102162956 A | 8/2011 |
| JP | 2011164471 | 8/2011 |
| TW | 201000966 A | 1/2010 |

* cited by examiner

LIQUID CRYSTAL DISPLAY WITH COLOR MOTION BLUR COMPENSATION STRUCTURES

This application is a continuation of patent application Ser. No. 14/850,015, filed Sep. 10, 2015, which claims the benefit of provisional patent application No. 62/128,453, filed Mar. 4, 2015, both of which are hereby incorporated by reference herein in their entireties. This application claims the benefit of and claims priority to patent application Ser. No. 14/850,015, filed Sep. 10, 2015 and provisional patent application No. 62/128,453 filed on Mar. 4, 2015.

BACKGROUND

This relates generally to electronic devices, and more particularly, to electronic devices with displays.

Electronic devices often include displays. For example, cellular telephones and portable computers often include displays for presenting information to a user.

Liquid crystal displays contain a layer of liquid crystal material. Pixels in a liquid crystal display contain thin-film transistors and electrodes for applying electric fields to the liquid crystal material. The strength of the electric field in a pixel controls the polarization state of the liquid crystal material and thereby adjusts the brightness of the pixel.

The speed with which liquid crystal pixels switch can vary as a function of applied voltage. As a result, the amount of time required to switch a black pixel to a gray level will be longer than the amount of time required to switch a black pixel to a white level. In some situations, it may be desirable to move a black object on a screen with a colored background. In this type of scenario, subpixels of different colors may have different target pixel values and may therefore switch at different speeds. This may result in production of unpleasant colored motion blur effects when the black object is moved.

It would therefore be desirable to be able to provide improved displays for electronic devices such as displays with reduced color motion blur.

SUMMARY

A display may have upper and lower display layers. A layer of liquid crystal material may be interposed between the upper and lower display layers. The display may include an upper and lower polarizer and a backlight for providing illumination for the display layer. An array of color filter elements may be used to provide the display with the ability to display color images. The color filter elements may include red, green, and blue elements or color filter elements of different colors. The display may have an array of pixels each of which has subpixels such as red, green, and blue subpixels formed using the red, green, and blue color filter elements.

The display layers may include a layer of thin-film transistor circuitry that has subpixel electrodes for applying electric fields to the layer of liquid crystal material for each of the subpixels. The subpixels of different colors may have different electrode shapes (e.g., fingers oriented at different angles) and/or may have different liquid crystal layer thicknesses. These subpixel differences may be configured to slow the switching speed of the subpixels of a certain color relative to other subpixels to reduce color motion blur when an object of one color is moved across a background of another color.

DETAILED DESCRIPTION

Electronic devices may include displays. The displays may be used to display images to a user. Illustrative electronic devices that may be provided with displays are shown in FIGS. 1, 2, 3, and 4.

Figure 1:
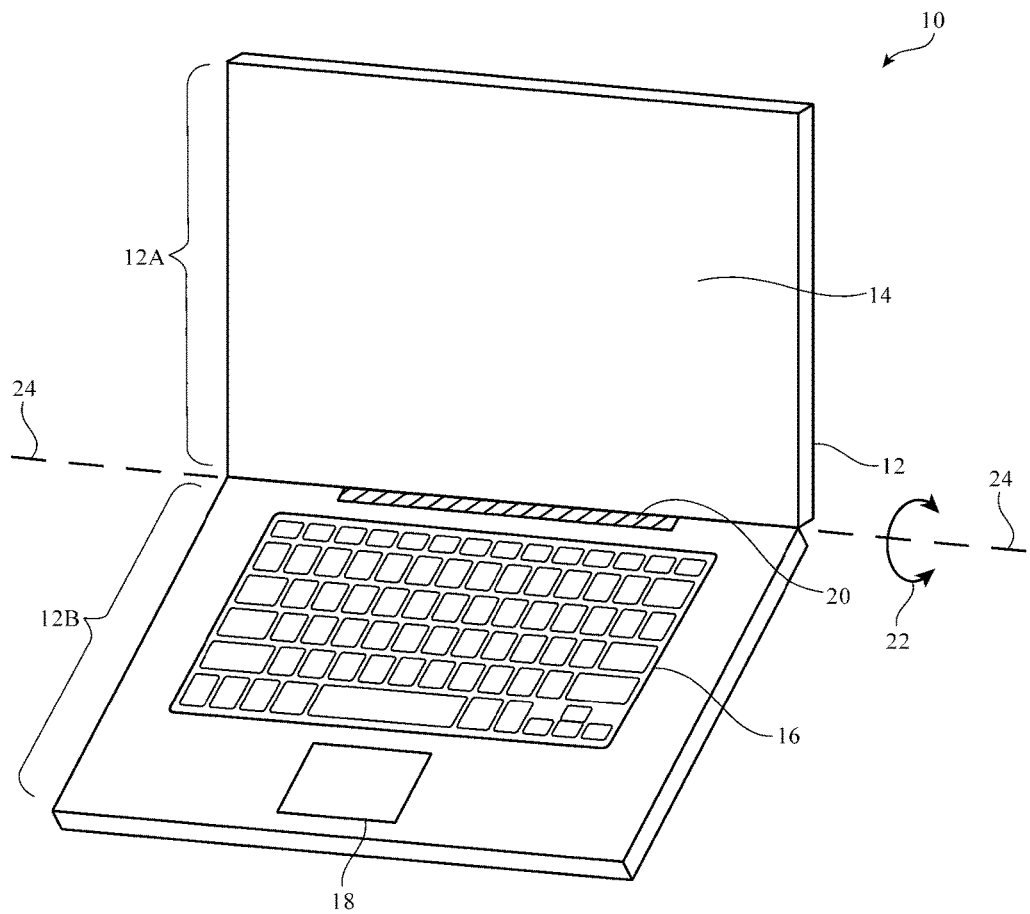
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
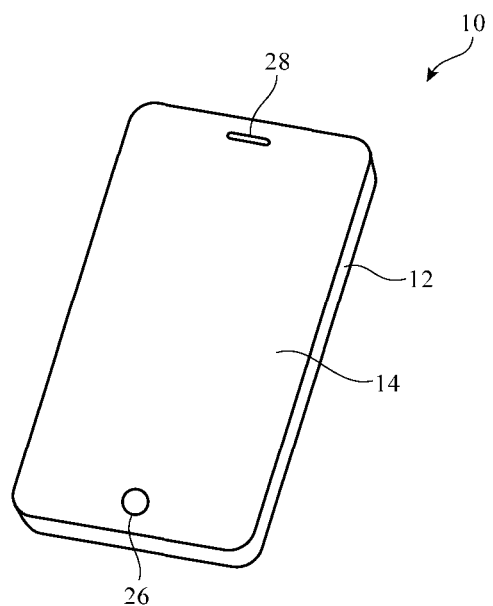
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
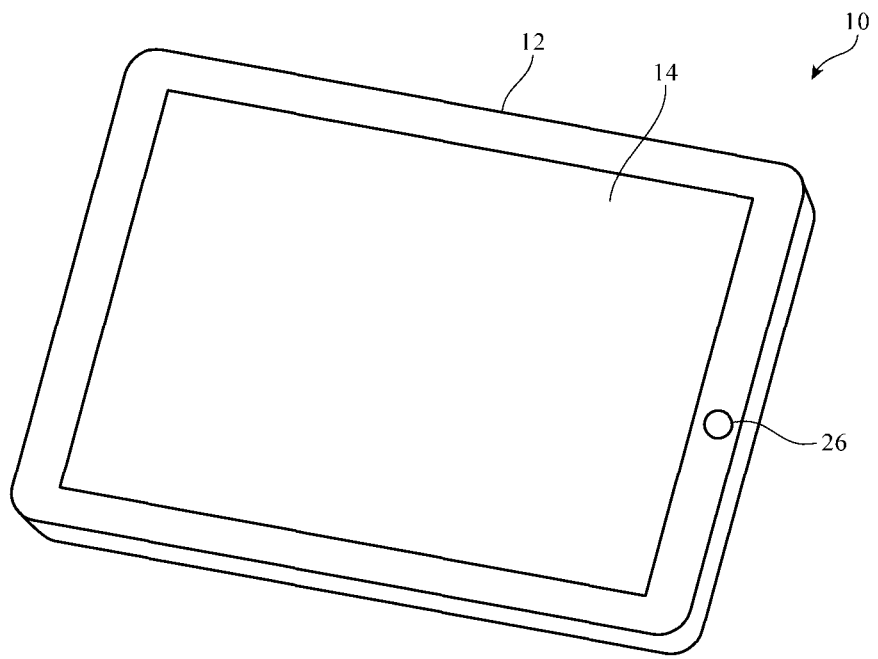
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
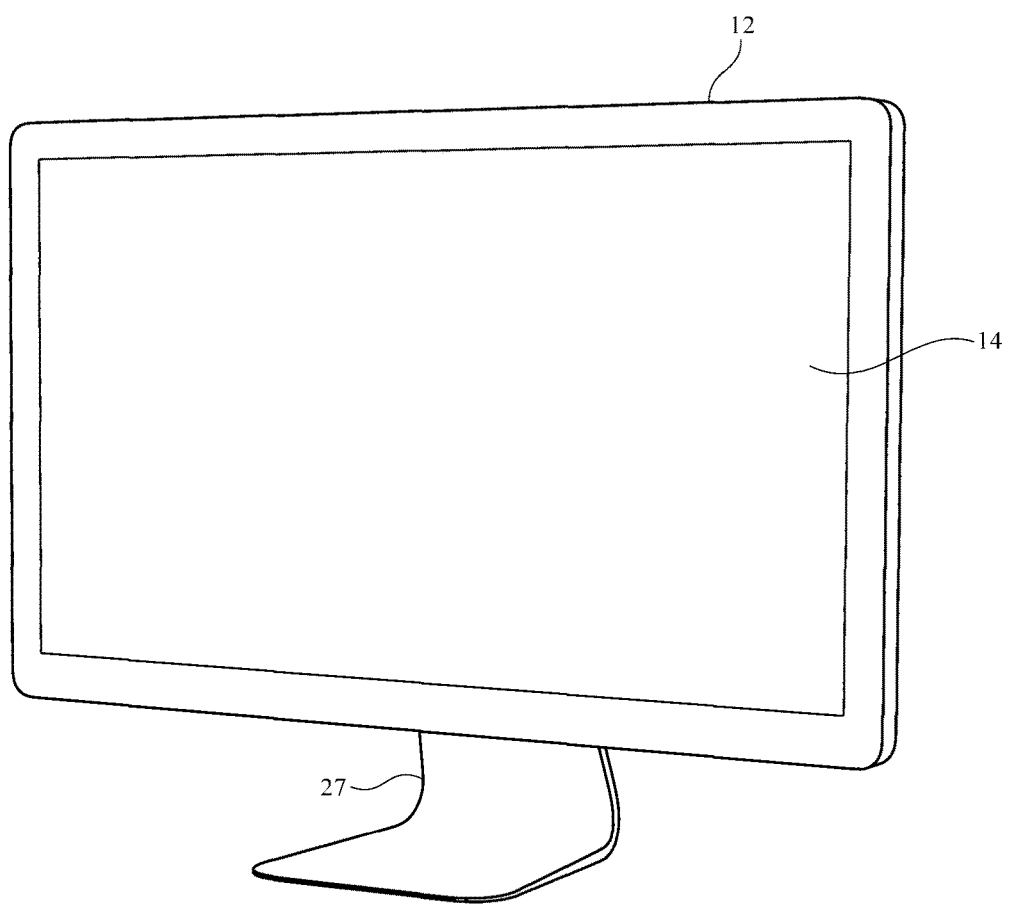
FIG. 4 is a perspective view of an illustrative electronic device such as a computer display with display structures in accordance with an embodiment.

FIG. 4 shows how electronic device 10 may be a display such as a computer display or may be a computer that has been integrated into a computer display. With this type of arrangement, housing 12 for device 10 may be mounted on a support structure such as stand 27 or stand 27 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components. A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
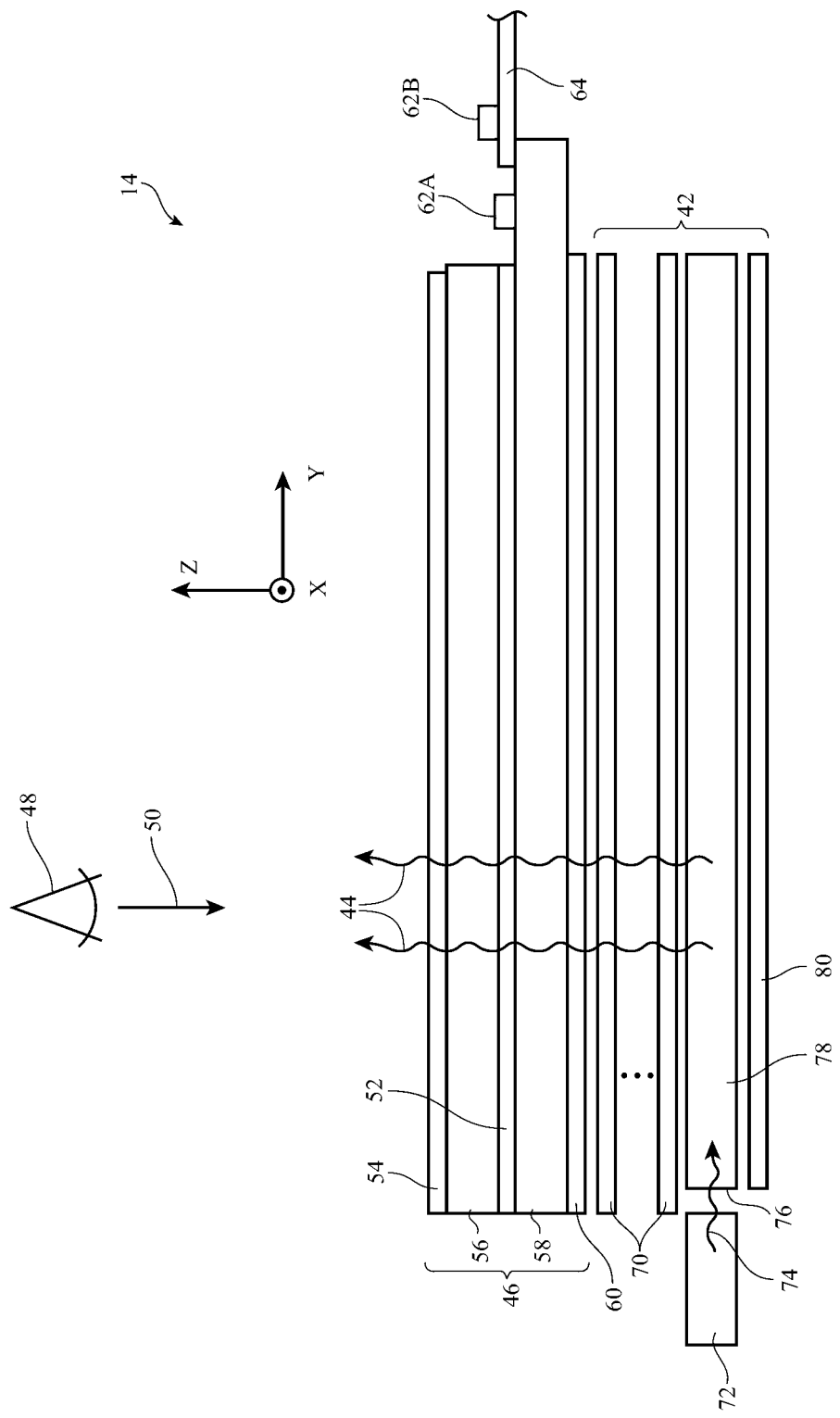
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 58 and 56 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78. Light source 72 may be located at the left of light guide plate 78 as shown in FIG. 5 or may be located along the right edge of plate 78 and/or other edges of plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of plastic covered with a dielectric mirror thin-film coating.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, films such as compensation films may be incorporated into other layers of display 14 (e.g., polarizer layers).

Figure 6:
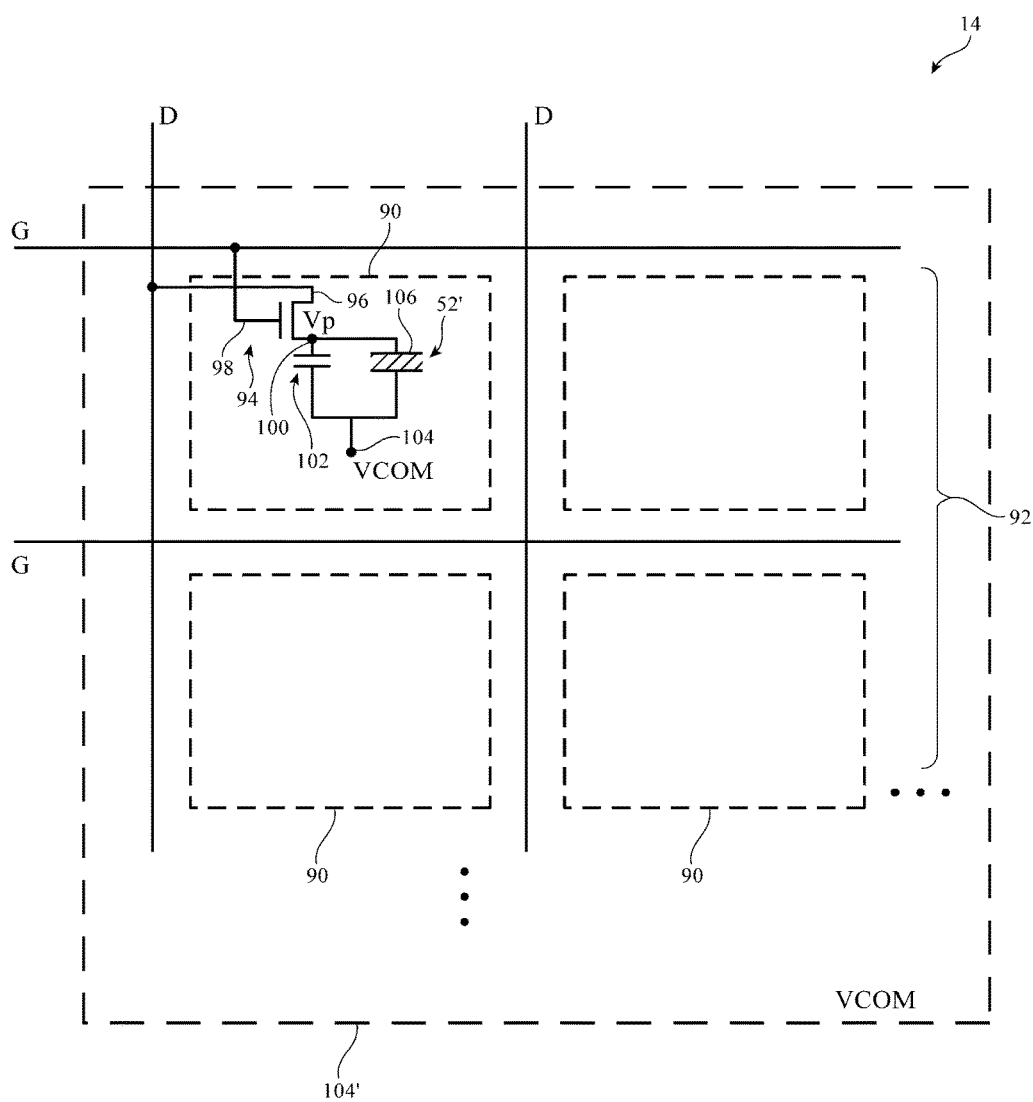
FIG. 6 is a top view of a portion of an array of pixels in a display in accordance with an embodiment.

As shown in FIG. 6, display 14 may include an array of pixels 90 such as pixel array 92. Pixel array 92 may be controlled using control signals produced by display driver circuitry. Display driver circuitry may be implemented using one or more integrated circuits (ICs) and/or thin-film transistors or other circuitry.

During operation of device 10, control circuitry in device 10 such as memory circuits, microprocessors, and other storage and processing circuitry may provide data to the display driver circuitry. The display driver circuitry may convert the data into signals for controlling pixels 90 of pixel array 92.

Pixel array 92 may contain rows and columns of pixels 90. The circuitry of pixel array 92 (i.e., the rows and columns of pixel circuits for pixels 90) may be controlled using signals such as data line signals on data lines D and gate line signals on gate lines G. Data lines D and gate lines G are orthogonal. For example, data lines D may extend vertically and gate lines G may extend horizontally (i.e., perpendicular to data lines D).

Pixels 90 in pixel array 92 may contain thin-film transistor circuitry (e.g., polysilicon transistor circuitry, amorphous silicon transistor circuitry, semiconducting oxide transistor circuitry such as InGaZnO transistor circuitry, other silicon or semiconducting-oxide transistor circuitry, etc.) and associated structures for producing electric fields across liquid crystal layer 52 in display 14. Each display pixel may have one or more thin-film transistors. For example, each display pixel may have a respective thin-film transistor such as thin-film transistor 94 to control the application of electric fields to a respective pixel-sized portion 52' of liquid crystal layer 52.

The thin-film transistor structures that are used in forming pixels 90 may be located on a thin-film transistor substrate such as a layer of glass. The thin-film transistor substrate and the structures of display pixels 90 that are formed on the surface of the thin-film transistor substrate collectively form thin-film transistor layer 58 (FIG. 5).

Gate driver circuitry may be used to generate gate signals on gate lines G. The gate driver circuitry may be formed from thin-film transistors on the thin-film transistor layer or may be implemented in separate integrated circuits. The data line signals on data lines D in pixel array 92 carry analog image data (e.g., voltages with magnitudes representing pixel brightness levels). During the process of displaying images on display 14, a display driver integrated circuit or other circuitry may receive digital data from control circuitry and may produce corresponding analog data signals. The analog data signals may be demultiplexed and provided to data lines D.

The data line signals on data lines D are distributed to the columns of display pixels 90 in pixel array 92. Gate line signals on gate lines G are provided to the rows of pixels 90 in pixel array 92 by associated gate driver circuitry.

The circuitry of display 14 may be formed from conductive structures (e.g., metal lines and/or structures formed from transparent conductive materials such as indium tin oxide) and may include transistors such as transistor 94 of FIG. 6 that are fabricated on the thin-film transistor substrate layer of display 14. The thin-film transistors may be, for example, silicon thin-film transistors or semiconducting-oxide thin-film transistors.

As shown in FIG. 6, pixels such as pixel 90 may be located at the intersection of each gate line G and data line D in array 92. A data signal on each data line D may be supplied to terminal 96 from one of data lines D. Thin-film transistor 94 (e.g., a thin-film polysilicon transistor, an amorphous silicon transistor, or an oxide transistor such as a transistor formed from a semiconducting oxide such as indium gallium zinc oxide) may have a gate terminal such as gate 98 that receives gate line control signals on gate line G. When a gate line control signal is asserted, transistor 94 will be turned on and the data signal at terminal 96 will be passed to node 100 as pixel voltage Vp. Data for display 14 may be displayed in frames. Following assertion of the gate line signal in each row to pass data signals to the pixels of that row, the gate line signal may be deasserted. In a subsequent display frame, the gate line signal for each row may again be asserted to turn on transistor 94 and capture new values of Vp.

Pixel 90 may have a signal storage element such as capacitor 102 or other charge storage elements. Storage capacitor 102 may be used to help store signal Vp in pixel 90 between frames (i.e., in the period of time between the assertion of successive gate signals).

Display 14 may have a common electrode coupled to node 104. The common electrode (which is sometimes referred to as the common voltage electrode, Vcom electrode, or Vcom terminal) may be used to distribute a common electrode voltage such as common electrode voltage Vcom to nodes such as node 104 in each pixel 90 of array 92. As shown by illustrative electrode pattern 104' of FIG. 6, Vcom electrode 104 may be implemented using a blanket film of a transparent conductive material such as indium tin oxide, indium zinc oxide, other transparent conductive oxide material, and/or a layer of metal that is sufficiently thin to be transparent (e.g., electrode 104 may be formed from a layer of indium tin oxide or other transparent conductive layer that covers all of pixels 90 in array 92).

In each pixel 90, capacitor 102 may be coupled between nodes 100 and 104. A parallel capacitance arises across nodes 100 and 104 due to electrode structures in pixel 90 that are used in controlling the electric field through the liquid crystal material of the pixel (liquid crystal material 52'). As shown in FIG. 6, electrode structures 106 (e.g., a display pixel electrode with multiple fingers or other display pixel electrode for applying electric fields to liquid crystal material 52') may be coupled to node 100 (or a multi-finger display pixel electrode may be formed at node 104). During operation, electrode structures 106 may be used to apply a controlled electric field (i.e., a field having a magnitude proportional to Vp-Vcom) across pixel-sized liquid crystal material 52' in pixel 90. Due to the presence of storage capacitor 102 and the parallel capacitances formed by the pixel structures of pixel 90, the value of Vp (and therefore the associated electric field across liquid crystal material 52') may be maintained across nodes 106 and 104 for the duration of the frame.

The electric field that is produced across liquid crystal material 52' causes a change in the orientations of the liquid crystals in liquid crystal material 52'. This changes the polarization of light passing through liquid crystal material 52'. The change in polarization may, in conjunction with polarizers 60 and 54 of FIG. 5, be used in controlling the amount of light 44 that is transmitted through each pixel 90 in array 92 of display 14.

In displays such as color displays, color filter layer 56 is used to impart different colors to different pixels. As an example, each pixel 90 in display 14 may contain three (or more than three) different subpixels each with a different respective color. With one suitable arrangement, which may sometimes be described herein as an example, each pixel 90 has a red subpixel, a green subpixel, and a blue subpixel. Each subpixel is driven with an independently selected pixel voltage Vp. The amount of voltage that is supplied to the electrodes of each subpixel is associated with a respective digital pixel value (e.g., a value ranging from 0 to 255 or other suitable digital range). Desired pixel colors may be produced by adjusting the pixel values for each of the three subpixels in a pixel. For example, a black pixel may be associated with a 0 pixel value for the red subpixel, a 0 pixel value for the green subpixel, and a 0 pixel value for the blue subpixel. As another example, an orange pixel may be associated with pixel values of 245, 178, and 66 for the red, green, and blue subpixels. White may be represented by pixel values of 255, 255, and 255.

The response times of the pixels in display 14 may vary as a function of the magnitude of the liquid crystal switching voltage applied to electrodes 106. When switching a black pixel, which has red, green, blue pixel values of (0, 0, 0), to a white pixel (255, 255, 255), each subpixel (red, green, and blue) is provided with the same target pixel value (i.e., 255) and starts from the same initial pixel value (i.e., 0), so the voltage applied across liquid crystal layer 52 during switching is the same for each subpixel. As a result, all subpixels will switch at the same time. This type of switching scenario may arise when moving black text, a black cursor, or other black item against a white background.

Other pixel switching scenarios may create color motion blur due to the unequal response times that arise when driving subpixels of different colors with different pixel values. As an example, consider the response of a pixel when switching from black (0, 0, 0) to orange (245, 178, and 66). In this situation, a large voltage drop appears across the red subpixel (i.e., a voltage drop associated with a difference in before and after digital values of 245) and lower voltage drops appear across the green subpixel (a voltage associated with pixel value change of 178) and blue subpixel (a pixel value change of 66). Because the voltage on the red subpixel (and therefore the electric field applied by the red electrode 106 to the liquid crystal layer) is relatively large, the liquid crystal molecules of the red subpixel will rotate more quickly than the liquid crystal molecules of the green and blue subpixels. The red subpixel will therefore change color (from black to red) faster than the green and blue subpixels will switch from black to green and black to blue, respectively. The disparate switching speeds of the subpixels of different colors can lead to unpleasant visual artifacts. In the present example, in which a black item is being moved across an orange background, the relatively faster switching speed of the red subpixels has the potential to create undesirable red motion blur effects.

Figure 7:
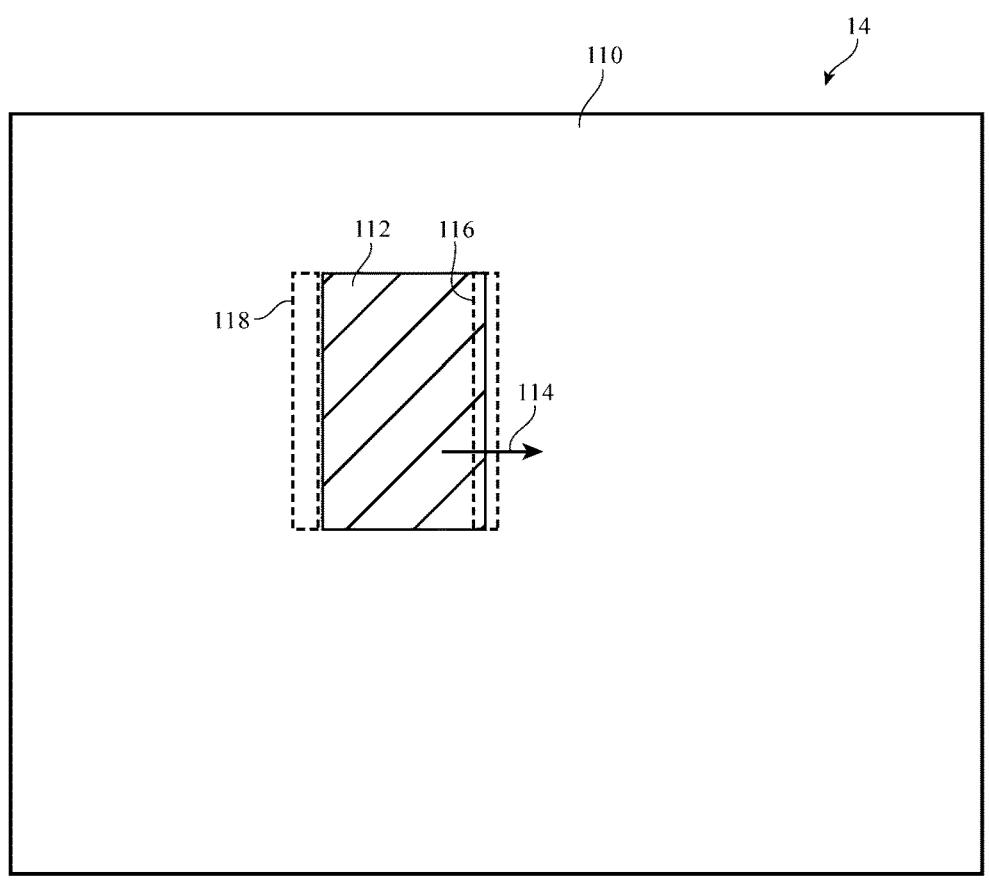
FIG. 7 is a diagram showing how motion of an object against a background has the potential to discolor pixels along the leading and trailing edges of the object and thereby create color motion blur effects.

Color motion blur effects can arise both at the leading edge of a moving object and at the trailing edge of a moving object. For example, consider the movement of object 112 across background 110 of display 14 of FIG. 7. Object 112 may have a first color (e.g., black) and background 110 may have a second color (e.g., orange). Object 112 may be black text (as an example). Background 110 may have a color that is desirable when presenting electronic books to a user in a warm ambient lighting environment (e.g., indoor lighting). Object 112 may be moved across background 110 up and down during scrolling, right and left when panning, etc. In the example of FIG. 7, object 112 is moving to the right in direction 114.

At trailing edge 118, black pixels (0, 0, 0) are being switched to orange (245, 178, 66). Black-to-white switching speeds (rise times) may vary considerably depending on switching voltage levels. Because the red pixels are provided with a larger switching voltage than the green and blue pixels when switching from black to orange, the red pixels in region 116 may switch from black more quickly than the green and blue pixels, leading to blurred colors in region 118. In particular, the pixels of display 14 in region 118 have the potential to develop a significant red color due to the enhanced switching speed of the red subpixels relative to the blue and green subpixels.

At leading edge 116 of object 112, pixels are switching from background color 110 to the color of object 112. For example, pixels in leading edge 116 may be switching from (245, 178, 66) to black (0, 0, 0). The red pixels in this situation may exhibit slightly slower decay times than the green and blue pixels, leading to gray motion blur.

Figure 8:
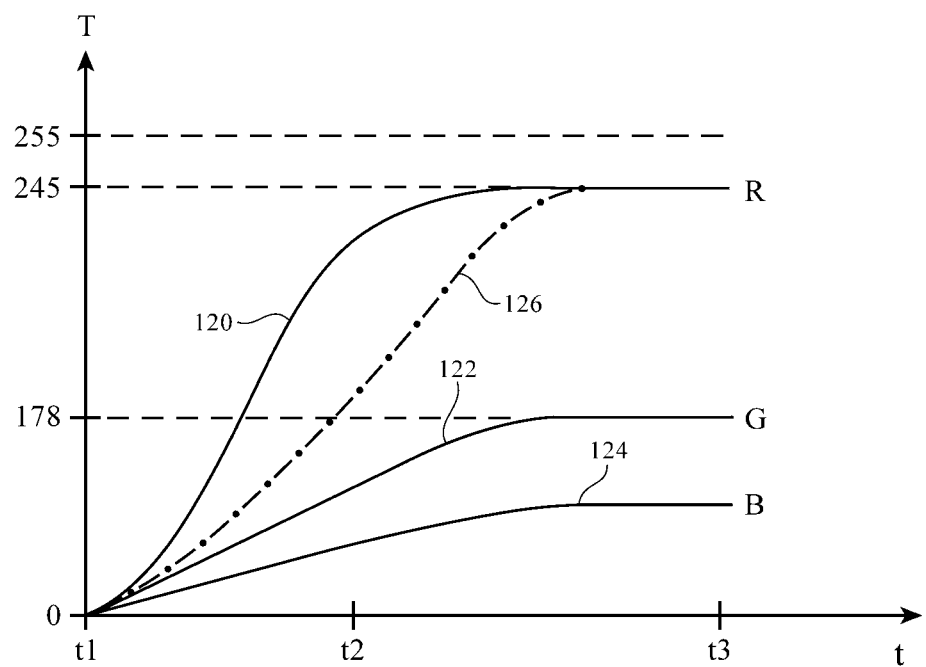
FIG. 8 is a graph showing how red, green, and blue subpixels in a display may have different target pixel values during color transitions such as those associated with movement of the object of FIG. 7 and therefore have the potential to switch with different speeds in accordance with an embodiment.

A graph showing how pixels with different colors have the potential to switch at different speeds during particular color transitions is shown in the graph of FIG. 8 in which subpixel transmission T (proportional to subpixel output intensity) has been plotted as a function of time t. In the example of FIG. 8, the situation at trailing edge 118 of FIG. 7 is being illustrated. Initially (at time t1), the pixels are black (0, 0, 0). At time t3, object 112 has moved away from edge 118 and each of the subpixels have had sufficient time to acquire their desired target value (i.e., the red subpixel has acquired value 245, the green subpixel has acquired value 178, and the blue subpixel has acquired value 66). The switching progress of the red, green, and blue subpixels in a conventional display at intermediate times between times t1 and t3 is illustrated by curves 120 (for red), 122 (for green), and 124 (for blue). These curves (which are not normalized in the graph of FIG. 8) exhibit transitions at different speeds. The green and blue curves 122 and 124 transition relatively slowly. The red curve (curve 120) transitions rapidly, because the target value for the red subpixel is relatively high (245). Because red curve 120 rises steeply compared with green curve 122 and blue curve 124, the color of the pixels in trailing edge 118 (which are associated with time t2) will be overly red in color.

To restore the desired balance between the red, green, and blue subpixels in trailing edge 118 and therefore minimize red motion blur effects, the subpixels of display 14 may be configured to equalize the switching speeds of the red, green, and blue subpixels in certain switching scenarios (e.g., when switching from black to orange as described in connection with the present example and/or when switching between other color combinations). In particular, the shape and/or liquid crystal layer thickness of the red subpixel may be configured to slow the red subpixel switching speed relative to the switching speeds of the green and blue subpixels. When configured in this way, display 14 will exhibit a slower red pixel switching characteristic such as curve 126. At intermediate times such as time t2 (i.e., for pixels in trailing edge 118), the red subpixel pixel value that is associated with curve 126 will not be excessive compared to the pixel values for the green and blue subpixels at time t2. As a result, edge 118 will not appear overly reddish and red motion blur effects will be suppressed.

Figure 9:
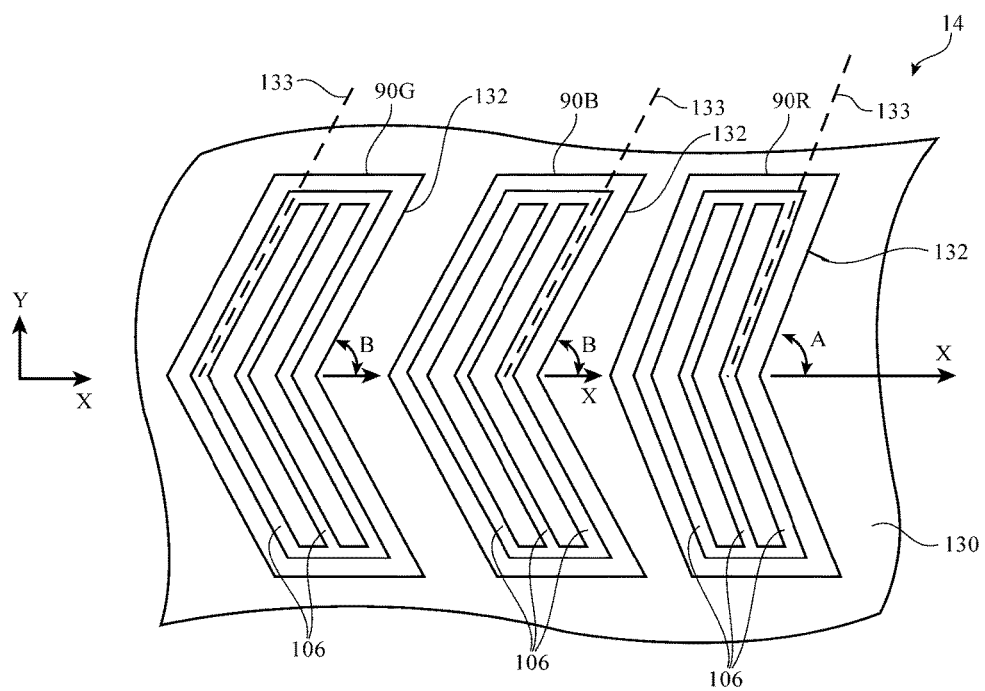
FIG. 9 is a top view of a portion of a display with an illustrative pixel pattern to reduce color motion blur effects in accordance with an embodiment.

Pixel switching characteristics can be influenced by factors such as electrode geometry and pixel cell thickness (i.e., liquid crystal layer thickness). One way in which to selectively adjust the switching speed of the pixels involves changing the layout of electrodes 106 in certain subpixels. This type of arrangement is shown in FIG. 9. In the example of FIG. 9, display 14 has subpixels of three colors. Each subpixel is associated with a respective chevron-shaped opening in black mask 130 and a corresponding set of electrode fingers 106 that have chevron shapes. If desired, shapes other than chevron shapes may be used for electrodes 106 and the openings of the pixels that contain electrodes 106 (e.g., rectangular shapes, subpixel openings with curved edges, etc.). The use of chevron-shaped electrode fingers and pixel openings is merely illustrative.

The shape of the subpixels and, in particular, the angular spread of the arms of each chevron-shaped opening and the associated angular spread of the chevron-shaped fingers of the subpixel electrodes can be configured to be different for subpixels of different colors. In the example of FIG. 9, red subpixel 90R has an edge 132 that is angled at an angle A with respect to the X axis and electrode fingers 106 with a parallel longitudinal electrode axis 133 that is likewise angled at angle A with respect to the X axis. Edges 132 and axes 133 of the green subpixel 90G and the blue subpixel 90B and their electrodes are each angled at an angle B with respect to the X axis. The value of B may be smaller than the value of A. For example, A may be 85° and B may be 75°, so that the chevrons of red subpixels 90R (i.e., the chevron-shaped openings and the chevron-shaped electrodes 106) are less bent than the chevrons of green subpixels 90G and blue subpixels 90B. Other angles may be used, if desired.

Within each subpixel, the longitudinal axes 133 of pixel electrodes 106 run parallel to chevron edges 132, so the different shapes of the subpixels result in different orientations between the electric fields produced by the subpixels and the liquid crystal molecules in the subpixels.

The liquid crystal material that makes up liquid crystal layer 52 of display 14 may be either a negative liquid crystal material or a positive liquid crystal material. A negative liquid crystal exhibits a negative dielectric anisotropy, whereas a positive liquid crystal exhibits a positive dielectric anisotropy. The liquid crystal molecules (liquid crystals) in a negative liquid crystal align perpendicularly to applied electric fields (i.e., the longitudinal axis of negative liquid crystal molecules will orient perpendicular to applied electric fields from electrodes 106). The liquid crystal molecules in a positive liquid crystal align parallel to applied electric field (i.e., the longitudinal axis of positive liquid crystal molecules will oriented parallel to applied electric fields).

In a negative liquid crystal configuration for display 14, the longitudinal axis of the negative liquid crystal molecules runs along the X axis prior to application of electric field by electrodes 106. In a positive liquid crystal configuration for display 14, the longitudinal axis of the positive liquid crystal molecules runs along the Y axis prior to application of electric field by electrodes 106. Despite having perpendicular initial (unrotated) orientations, the angles made by the liquid crystal dipoles associated with the negative and positive liquid crystal molecules with respect to the edges 132 of the subpixels (and therefore the longitudinal axes 133 of electrodes 106) is the same. In the present example, the dipole of a negative liquid crystal, which runs along the Y axis when the negative liquid crystal is unrotated, will make will make an angle of 90-A with respect to edge 132 of red subpixel 90R (i.e., the dipole of the unrotated negative liquid crystal to the longitudinal axis of electrodes 106 will be 5° in the present example). The dipole of a positive liquid crystal runs along the Y axis when the positive liquid crystal is unrotated and will therefore make the same angle of 90-A with respect to edge 132 of red subpixel 90R (i.e., the dipole of the unrotated positive liquid crystal to the longitudinal axis of electrodes 106 will be 5° in the present example). In subpixels 90G and 90B, the angle between the liquid crystal molecule dipole and the longitudinal axis 133 of electrodes 106 will be 15° (i.e., an angle greater than the angle for the red subpixel).

The increased angle between the liquid crystal dipole and longitudinal electrode axis for the green and blue subpixels will tend to increase their switching speed relative to the red subpixel in switching scenarios of the type described in connection with FIG. 7 and will therefore compensate display 14 for red motion blur. Although angles of 5° and 15° have been used for this example, other electrode-axis-to-liquid-crystal-dipole angle values may be used if desired. In a configuration in which the subpixels have chevron shapes, flatter (less bent) chevrons can be used for red subpixels than are used for green and blue subpixels to help slow red subpixel switching and thereby suppress red motion blur effects when a black object is moved against a background with a color such as orange that has more red content than blue and green content.

Figure 10:
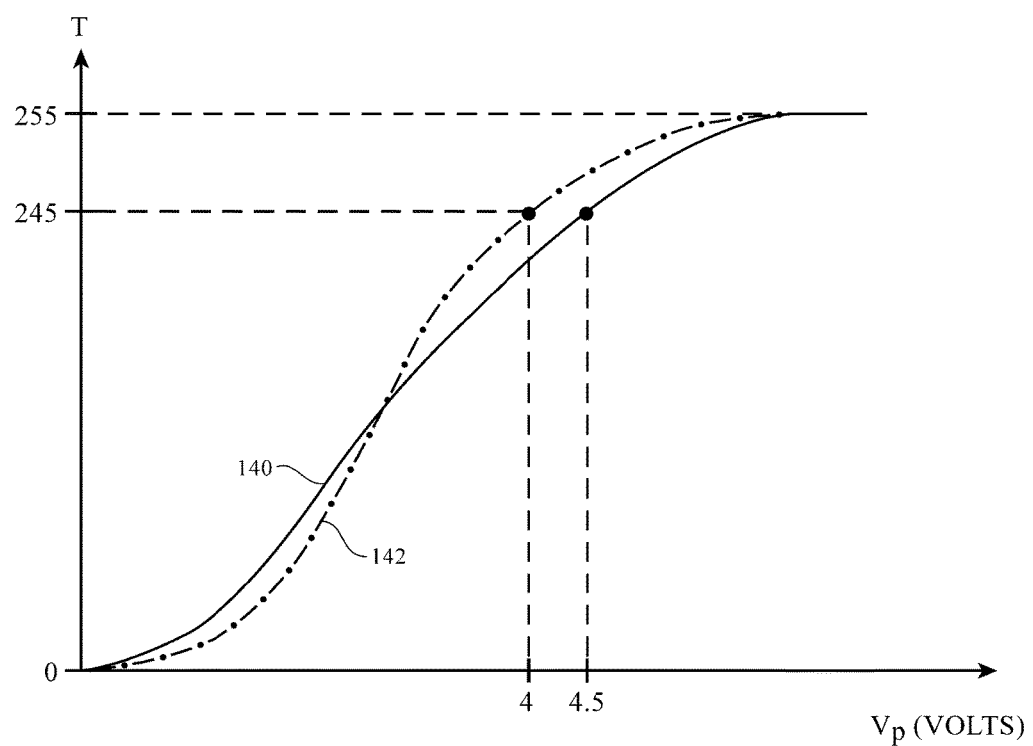
FIG. 10 is a graph in which illustrative normalized transmission-versus-applied-pixel-voltage curves have been plotted for different types of subpixels in accordance with an embodiment.

FIG. 10 is a graph of a simulation in which transmission T has been plotted against applied pixel voltage Vp for a subpixel with an unmodified and a modified dipole-to-electrode-axis angle. When the angle is unmodified (e.g., 10°), the subpixel will achieve a transmission level of 245 (the desired level for switching a red subpixel in the present black-to-orange switching example) with an applied voltage of 4.5 volts (curve 140), but will achieve this same desired transmission level with an application of only 4 volts when the red subpixel is modified to exhibit a dipole-to-electrode-axis angle of 5° (curve 142). The lower value of the pixel voltage required to achieve pixel value 245 with the modified arrangement (e.g., the arrangement with less bent chevrons for the red pixels) will allow the red subpixels to be switched using a lower voltage. The lower switching voltage (i.e., 4 volts instead of 4.5 volts in this example), will cause the red pixel switching speed to be reduced as desired.

Figure 11:
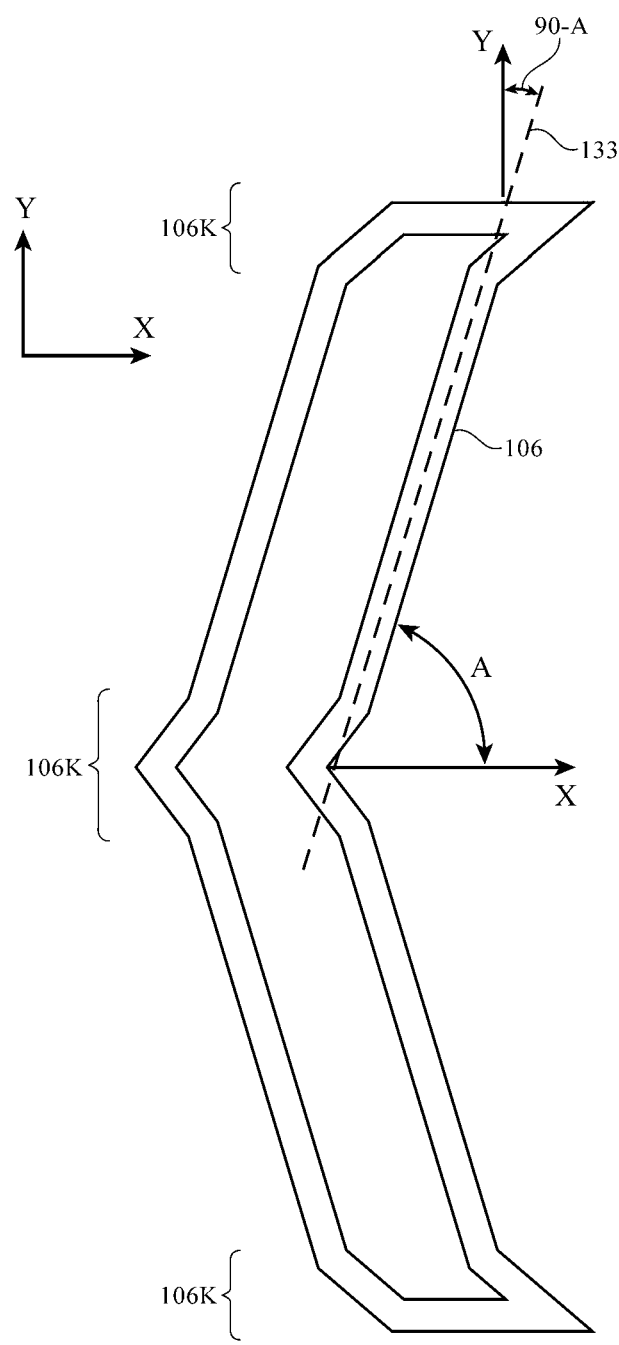
FIG. 11 is a top view of an illustrative set of pixel electrodes in which electrode fingers have a chevron shape with center and end kinks in accordance with an embodiment.

If desired, electrodes 106 may have chevron shapes with kinks. As shown in the illustrative configuration of FIG. 11, for example, electrodes 106 may have a main portion in which the fingers of the electrodes run parallel to each other (and are oriented at an angle such as illustrative angle 90-A with respect to the Y axis for the illustrative subpixel in FIG. 11). Kinks 106K in the electrodes may be formed from short segments of the electrodes that have different angles (i.e., angles greater than 90-A) with respect to the Y axis. Kinks 106K may, for example, be located in the center of electrodes 106 (i.e., to form a central kinked portion) and/or at the ends of electrodes 106 (i.e., to form end kinks).

Figure 12:
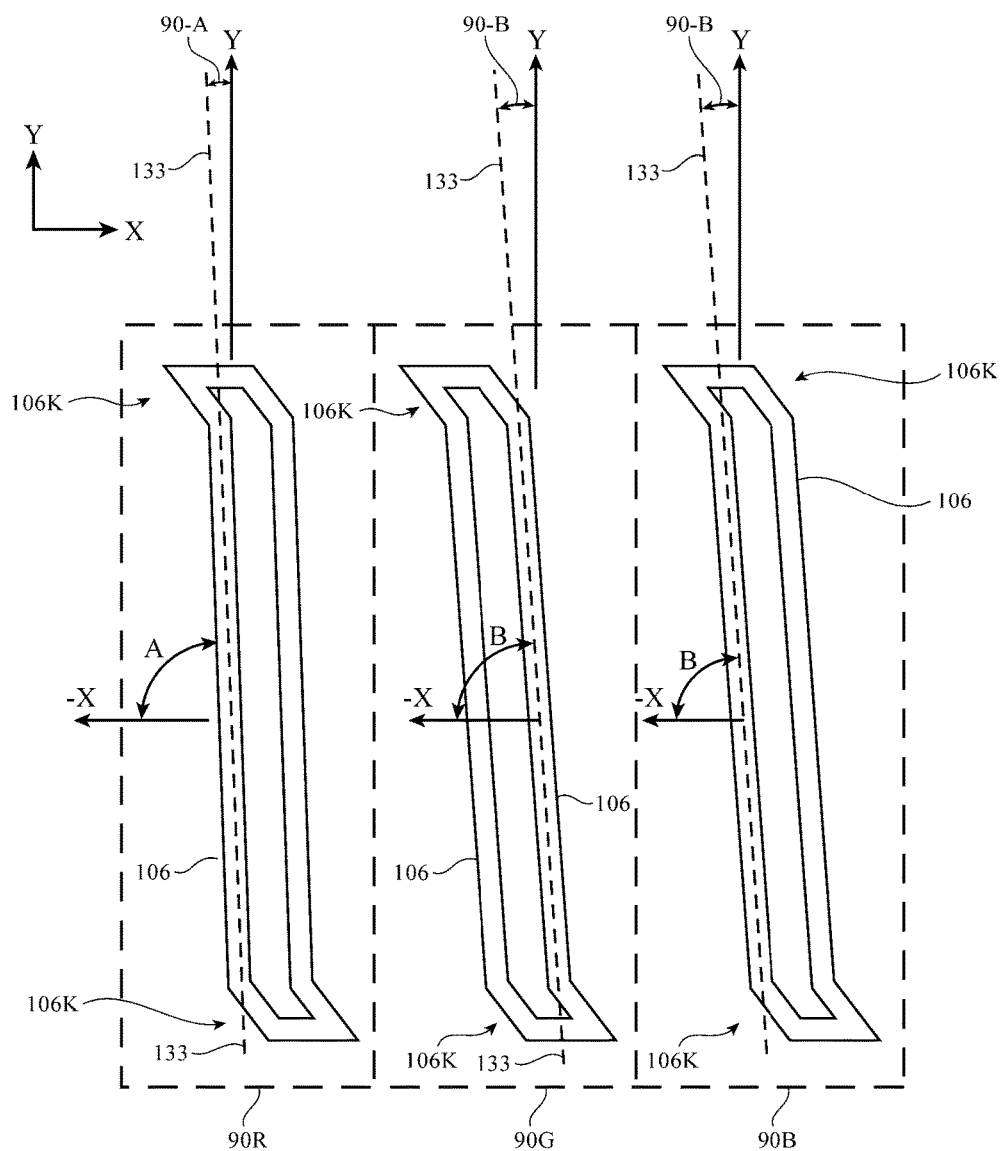
FIG. 12 is a top view of an illustrative set of subpixels of different colors showing how the electrodes in the subpixels may have fingers with different orientation angles and end kinks in accordance with an embodiment.

FIG. 12 is an illustrative layout for electrodes 106 in which electrodes 106 have a non-chevron shape. In the example of FIG. 12, electrode fingers 106 (i.e., longitudinal electrode finger axes 133) run diagonally across each subpixel. Electrode fingers 106 are oriented at an angle of 90-A with respect to the Y axis in red subpixel 90R (so that the electrode finger axis is oriented at angle 90-A with respect to the liquid crystal dipole). Green subpixel 90G may have electrode fingers 106 with axes 133 that are oriented at angle 90-B with respect to the Y axis (and with respect to the liquid crystal dipole). Blue subpixel 90B may likewise have electrode fingers 106 with axes 133 oriented at angle 90-B with respect to the liquid crystal dipole or, if desired, blue subpixels 90B of FIG. 12 (and any other blue subpixels such as chevron-shaped blue subpixels of FIG. 9, etc.) may have a different angle (e.g., an angle 90-C where C is different than B and is different than A). Configurations in which each subpixel color has fingers oriented at a different angle may provide display 14 with an enhanced ability to combat different types of color motion blur, but may be consume more area than displays in which angles C and B are identical.

Figure 13:
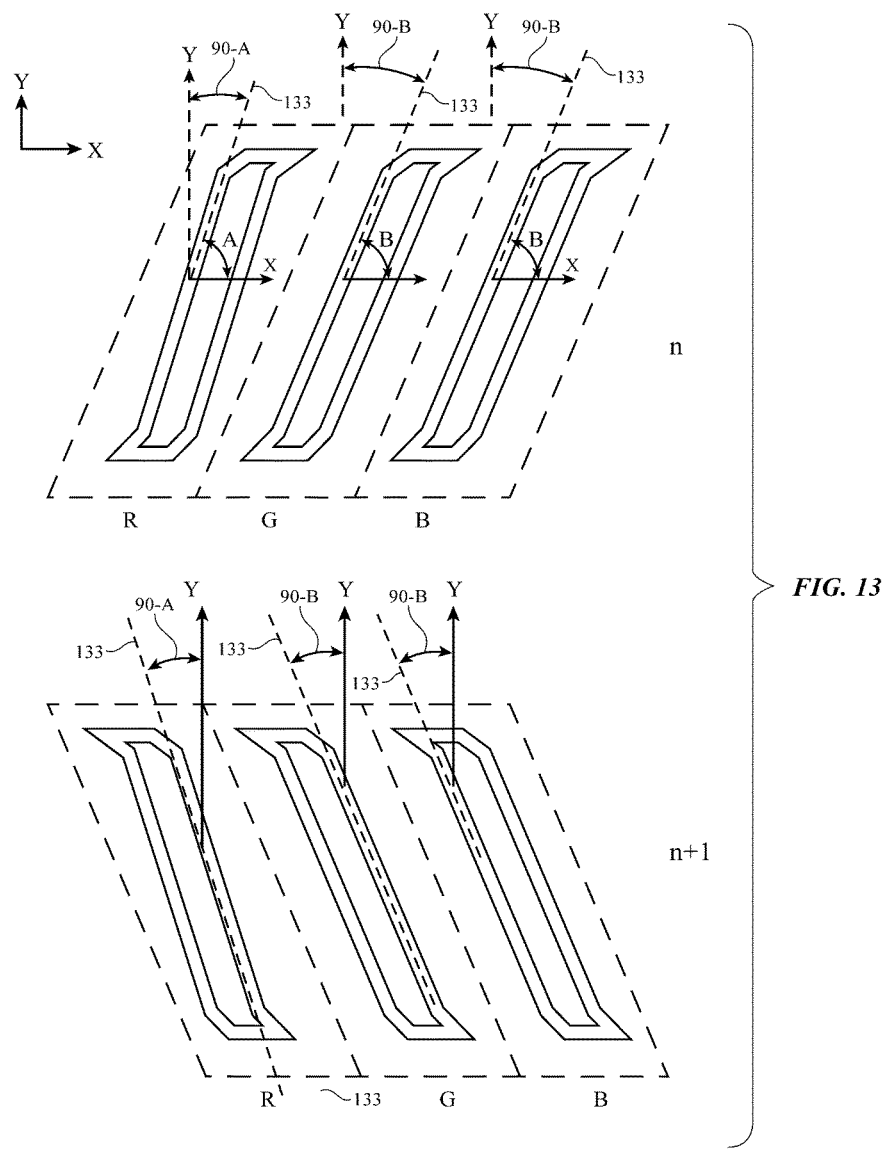
FIG. 13 is a top view of an illustrative set of subpixels of different colors showing how the fingers in the electrodes may have different orientation angles and may alternate between positive and negative orientation angles in successive rows of a pixel array in a display in accordance with an embodiment.

FIG. 13 shows an illustrative configuration in which the subpixels in some rows (e.g., row n) have electrode fingers 106 that are rotated slightly clockwise from axis Y (by angles such as angles 90-A for subpixel 90R and 90-B for subpixel 90G, and optionally another angle 90-C for blue pixel 90B) and have other rows (e.g., row n+1) in which electrode fingers 106 are rotated slightly counterclockwise in the same way.

In general, subpixels 90R, 90G, and 90B may have electrodes with any suitable shapes (i.e., any suitable electrode finger orientations relative to the liquid crystal dipole of layer 52). The electrode configurations of FIGS. 9, 11, 12, and 13 are merely illustrative.

Figure 14:
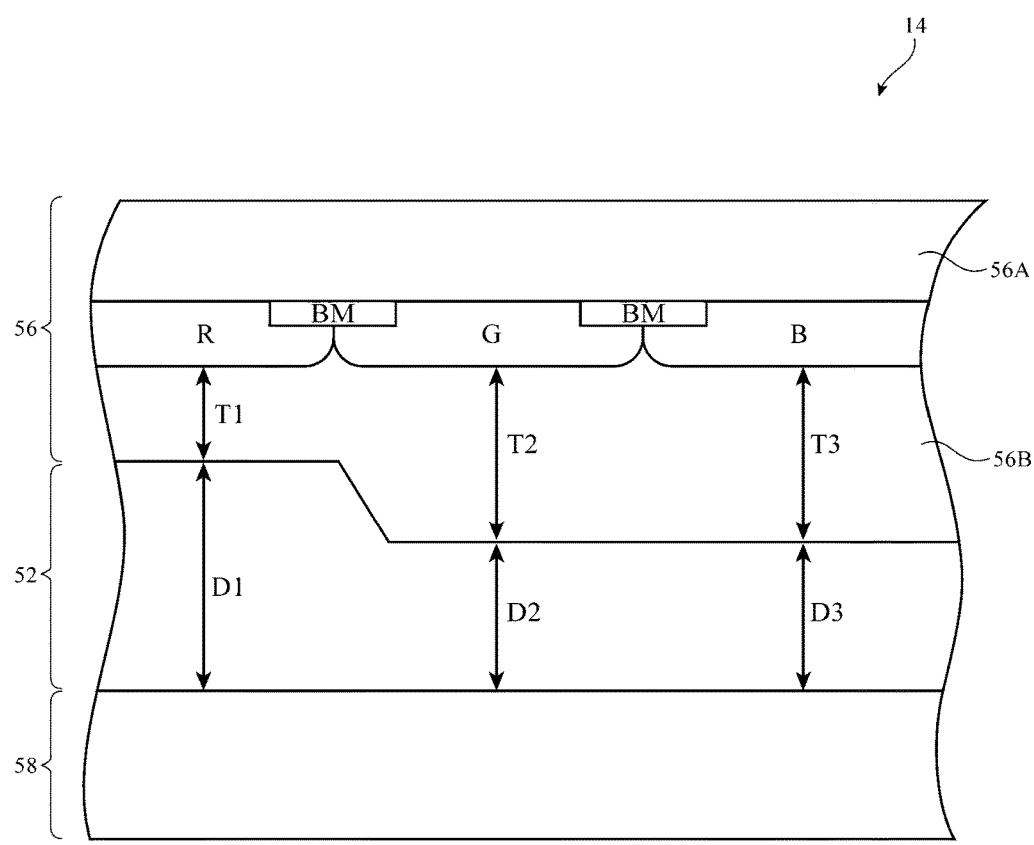
FIG. 14 is a cross-sectional side view of an illustrative display in which liquid crystal layer thicknesses are different for subpixels of different colors to reduce color motion blur effects in accordance with an embodiment.

If desired, the switching speed of the red subpixel may be slowed by increasing the cell gap for the red subpixels relative to the blue and green subpixels. This type of configuration is shown in the cross-sectional side view of display 14 of FIG. 14. As shown in FIG. 14, color filter layer 56 may have a color filter layer substrate 56A (e.g., a layer of clear material such as transparent glass, plastic, ceramic, etc.). Color filter elements such as red element R, green element G, and blue element B may be patterned onto substrate 56A (e.g., using photoimageable colored polymer and photolithographic patterning techniques). Black masking layer 130 may have chevron-shaped openings or other suitable openings that are aligned with the color filter elements.

Using a halftone mask, multiple masks and multiple deposition steps, or other techniques, a clear overcoat layer with multiple thicknesses such as overcoat layer 56B (e.g., a clear photoimageable polymer layer or other suitable layer) may be deposited on the array of color filter elements on substrate 56A. Layer 56B may have a thickness of T1 in areas that overlap the red subpixels of display 14 and may have larger thicknesses such as respective thicknesses T2 and T3 in the green and blue subpixels of display 14. Thicknesses T2 and T3 may be equal to each other or may be different. As a result, the thickness of liquid crystal layer 52 in the red subpixels will be larger (D1) than in the green and blue subpixels (D2 and D3, respectively). Switching speed is slower for thicker cell gaps (e.g., decay times may be proportional to the square of the liquid crystal thickness and rise times may be similarly increased when liquid crystal layer thickness increases). The larger value of liquid crystal layer thickness D1 in the red subpixels when compared to the smaller value of liquid crystal layer thicknesses D2 and D3 in the blue and green subpixels will therefore slow the red subpixel switching speed relative to the green and blue subpixel switching speed to compensate for red motion blur effects of the type that may otherwise arise when moving an object such as object 112 against a background such as background 110.

If desired, selective pixel gap adjustment schemes of the type shown in FIG. 14 may be used in combination with the selective electrode axis flattening schemes of the type shown in FIGS. 9, 11, 12, and 13 and/or other selective adjustments may be made to the subpixel structures for subpixels of particular colors to compensate for color motion blur. The examples of FIGS. 9, 11, 12, and 13 are merely illustrative.

The foregoing is merely illustrative and various modifications can be made by those skilled in the art without departing from the scope and spirit of the described embodiments. The foregoing embodiments may be implemented individually or in any combination.

What is claimed is:

1. A liquid crystal display having rows and columns of subpixels including red subpixels, green subpixels, and blue subpixels, comprising:
   upper and lower display layers; and
   a layer of liquid crystal material between the upper and lower display layers, wherein one of the upper and lower display layers comprises:
      a substrate; and
      pixel electrodes for the subpixels, wherein the pixel electrodes are formed on the substrate, wherein the pixel electrodes have longitudinal axes, wherein liquid crystal molecules in the liquid crystal material are initially unrotated prior to application of electric fields with the pixel electrodes and have associated dipoles that make dipole-to-electrode-axis angles with respect to the longitudinal axes of the pixel electrodes, and wherein the green and blue subpixels in each row have a first dipole-to-electrode-axis angle and the red subpixels in each row have a second dipole-to-electrode-axis angle that is smaller than the first dipole-to-electrode-axis angle.

2. The liquid crystal display defined in claim 1 wherein the pixel electrodes have chevron shapes and wherein the pixel electrodes of the red subpixels have a chevron shape that is less bent away from a column direction than the chevron shapes of the pixel electrodes in the green and blue subpixels.

3. The liquid crystal display defined in claim 1 wherein the blue and green subpixels have pixel electrodes of different shapes than the red subpixels so that the blue and green subpixels exhibit normalized transmittance versus applied voltage curves with different shapes than the red subpixels.

4. The liquid crystal display defined in claim 1 further comprising a black masking layer on a substrate of the other one of the upper and lower display layers having openings for the subpixels, wherein the pixel electrodes align with the openings.

5. The liquid crystal display defined in claim 1 wherein a switching speed of the red subpixels for a given switching voltage is less than that of the green and blue subpixels.

6. A liquid crystal display having rows and columns of pixels including subpixels of a plurality of different colors, comprising:
   upper and lower display layers; and
   a layer of liquid crystal material between the upper and lower display layers, wherein one of the upper and lower display layers comprises:
      a substrate; and pixel electrodes for the subpixels, wherein the pixel electrodes are formed on the substrate, wherein the pixel electrodes have longitudinal axes, wherein liquid crystal molecules in the liquid crystal material are initially unrotated prior to application of electric fields with the pixel electrodes and have associated dipoles that make dipole-to-electrode-axis angles with respect to the longitudinal axes of the pixel electrodes, wherein the subpixels of the plurality of different colors include red subpixels, blue subpixels, and green subpixels, wherein the dipole-to-electrode-axis angles for the red subpixels are different than the dipole-to-electrode-axis angles for the green and blue subpixels and the dipole-to-electrode-axis angles for the green and blue subpixels are the same, and wherein the pixel electrodes have chevron shapes and wherein the chevron shape of the pixel electrodes of the blue subpixels is more bent away from a column direction than the chevron shape of the pixel electrodes of the red subpixels.

7. The liquid crystal display defined in claim 6 wherein the dipole-to-electrode-axis angles for the red subpixels are smaller than the dipole-to-electrode-axis angles for the blue and green subpixels.

* * * * *